US006999102B2

(12) United States Patent
Felser et al.

(10) Patent No.: US 6,999,102 B2
(45) Date of Patent: Feb. 14, 2006

(54) FRAMEWORK FOR OBJECTS HAVING AUTHORABLE BEHAVIORS AND APPEARANCES

(75) Inventors: Lawrence David Felser, Ithaca, NY (US); David Wayne Arsenault, Ithaca, NY (US)

(73) Assignee: Autodesk, Inc., San Rafael, CA (US)

( * ) Notice: Subject to any disclaimer, the term of this patent is extended or adjusted under 35 U.S.C. 154(b) by 167 days.

(21) Appl. No.: 10/223,179

(22) Filed: Aug. 19, 2002

(65) Prior Publication Data

US 2002/0191001 A1 Dec. 19, 2002

Related U.S. Application Data

(63) Continuation of application No. 09/450,207, filed on Nov. 29, 1999, now Pat. No. 6,462,751, which is a continuation of application No. 09/169,599, filed on Oct. 9, 1998, now Pat. No. 6,025,849, which is a continuation-in-part of application No. 09/092,383, filed on Jun. 5, 1998, now Pat. No. 6,064,386, and a continuation-in-part of application No. 09/088,116, filed on Jun. 1, 1998, now Pat. No. 6,232,983.

(51) Int. Cl.

| | |
|---|---|
| ***G09G 5/00*** | (2006.01) |
| ***G06T 11/20*** | (2006.01) |
| ***G06F 17/00*** | (2006.01) |
| ***G06F 9/44*** | (2006.01) |

(52) U.S. Cl. .................. 345/619; 345/441; 707/103 R; 717/104; 717/108

(58) Field of Classification Search ................. 345/619, 345/629, 964, 441; 707/100, 200, 103 R, 707/506; 717/104, 108; 715/515
See application file for complete search history.

(56) References Cited

U.S. PATENT DOCUMENTS

| | | | | | |
|---|---|---|---|---|---|
| 5,444,836 A | | 8/1995 | Hollingsworth et al. | .... | 345/634 |
| 5,455,599 A | * | 10/1995 | Cabral et al. | .............. | 345/440 |
| 5,490,241 A | | 2/1996 | Mallgren et al. | .......... | 345/440 |
| 5,513,309 A | | 4/1996 | Meier et al. | ............... | 345/860 |
| 5,564,004 A | | 10/1996 | Grossman et al. | .......... | 345/835 |
| 5,627,949 A | | 5/1997 | Letcher, Jr. | ................. | 345/420 |
| 5,633,955 A | | 5/1997 | Bozinovic et al. | .......... | 382/187 |
| 5,704,028 A | | 12/1997 | Shanel et al. | ............... | 345/440 |
| 5,760,774 A | | 6/1998 | Grossman et al. | .......... | 345/835 |
| 5,761,684 A | * | 6/1998 | Gibson | ....................... | 715/515 |
| 5,794,030 A | * | 8/1998 | Morsi et al. | ............ | 707/103 R |
| 5,818,457 A | | 10/1998 | Murata et al. | ............. | 345/629 |
| 5,851,686 A | * | 12/1998 | Aghajanian et al. | ........ | 428/614 |
| 5,856,828 A | | 1/1999 | Letcher, Jr. | ................. | 345/420 |

(Continued)

OTHER PUBLICATIONS

Mark Edel, "The Tinkertoy Graphical Programming Environment", IEEE, p. 1110 to 1115.
Townsend et al. QUE, "Microsoft Office 6–in–1 New Edition", p. 713.

*Primary Examiner*—Matthew C. Bella
*Assistant Examiner*—Anthony J Blackman
(74) *Attorney, Agent, or Firm*—Gates & Cooper LLP

(57) ABSTRACT

A framework is described that serves as an expression evaluator and notification manager for software objects, and can traverse individual object models to use parts of one model to define another. An object model (data model) is a map of an object's properties and methods, and the framework of the present invention binds to the properties and methods and intercepts access to the properties for storage and evaluation of variables within the definitions of the properties. Binding the framework to the object accesses and uses the type info for the object to determine the properties of the object. In addition, the framework provides a method for the object author to override and specialize the properties to describe extensions of the type information.

26 Claims, 3 Drawing Sheets

U.S. PATENT DOCUMENTS 5,873,106 A * 2/1999 Joseph ........................ 707/506
5,894,310 A 4/1999 Arsenault et al. ........... 345/679
5,900,874 A 5/1999 Shrader et al. ............. 345/846
6,025,849 A 2/2000 Felser et al. ................ 345/441
6,064,386 A 5/2000 Felser et al. ................ 345/629
6,219,055 B1 4/2001 Bhargava et al. ........... 345/850
6,232,983 B1 5/2001 Felser et al. ................ 345/649
6,480,856 B1 * 11/2002 McDonald et al. ......... 707/100

* cited by examiner

FRAMEWORK FOR OBJECTS HAVING AUTHORABLE BEHAVIORS AND APPEARANCES

CROSS REFERENCE TO RELATED APPLICATIONS

This application is a continuation application of the following co-pending and commonly assigned patent application, which is incorporated by reference herein:

U.S. patent application Ser. No. 09/450,207, entitled "FRAMEWORK FOR OBJECTS HAVING AUTHORABLE BEHAVIORS AND APPEARANCES", by Lawrence David Felser and David Wayne Arsenault, filed on Nov. 29, 1999, now U.S. Pat. No. 6,462,751 which is a continuation of U.S. patent application Ser. No. 09/169,599, now U.S. Pat. No. 6,025,849, entitled "FRAMEWORK FOR OBJECTS HAVING AUTHORABLE BEHAVIORS AND APPEARANCES", by Lawrence David Felser and David Wayne Arsenault, filed on Oct. 9, 1998, which is a continuation-in-part of U.S. patent application Ser. No. 09/092,383, now U.S. Pat. No. 6,064,386, entitled "SHAPE OBJECTS WITH AUTHORABLE BEHAVIORS AND APPEARANCES," by Lawrence D. Felser, et al., filed on Jun. 5, 1998; and U.S. patent application Ser. No. 09/088,116, now U.S. Pat. No. 6,232,983, entitled "POSITIONING AND ALIGNMENT AIDS FOR SHAPE OBJECTS WITH AUTHORABLE BEHAVIORS AND APPEARANCES," by Lawrence D. Felser, et al., filed on Jun. 1, 1998, all of which are incorporated by reference herein.

BACKGROUND OF THE INVENTION

1. Field of the Invention

The present invention relates generally to software objects, and in particular, to a method, apparatus, and article of manufacture for providing a framework for objects with authorable behaviors and appearances for computer programs.

2. Description of the Related Art

The use of Computer Assisted Drafting (CAD) application programs is well known in the art. Some CAD programs provide templates and palettes that help users create documents, graphical presentations, etc. However, these templates and palettes provide only limited assistance and do little to help the user connect standard CAD components, define new components, or define methods of manipulating the components within the CAD program.

Most standard components are predefined by the CAD program itself, leaving little room for the user to define custom shapes without using the predefined standard components as building blocks. A user must manipulate standard components to define a shape or outline, place them spatially proximate on a working screen, and then group them together using a grouping or wrapping function. This multiple step approach of dragging components onto the screen and then modifying the components to create a new shape or outline within a document is inefficient and time consuming.

Further, once a custom or semi-custom component is created, the custom or semi-custom component cannot use variables defined with expressions, and cannot be used with other shapes or components automatically. Moreover, the isolated creation of components that are not able to be shared between components and users, as well as the inability of present CAD programs to use expressions to define the component, limits the capabilities of current CAD programs.

The creation of components with current CAD programs is also not easily learned by a user. Further, these limitations prevent many users from utilizing the CAD program to its fullest extent.

Consequently, there is a need in the art for improved techniques for creating components in a CAD program, in order to create documents faster. Further, there is a need in the art for improved techniques for direct manipulation of software objects.

SUMMARY OF THE INVENTION

To address the requirements described above, the present invention discloses a method, apparatus, and article of manufacture for enabling the creation of authorable objects. The framework serves as an expression evaluator, notification manager, and can traverse individual object models to use properties of one model to define another. An object model (data model) is a map of an object's properties and methods. The framework of the present invention binds to the properties and methods and intercepts access to the properties for storage and evaluation of variables within the definitions of the properties.

Binding the Flex Property Container to the object accesses and uses the type info for the object to determine the properties of the object. In addition, the framework provides a method for the object author to override and specialize the properties to describe extensions of the type information.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
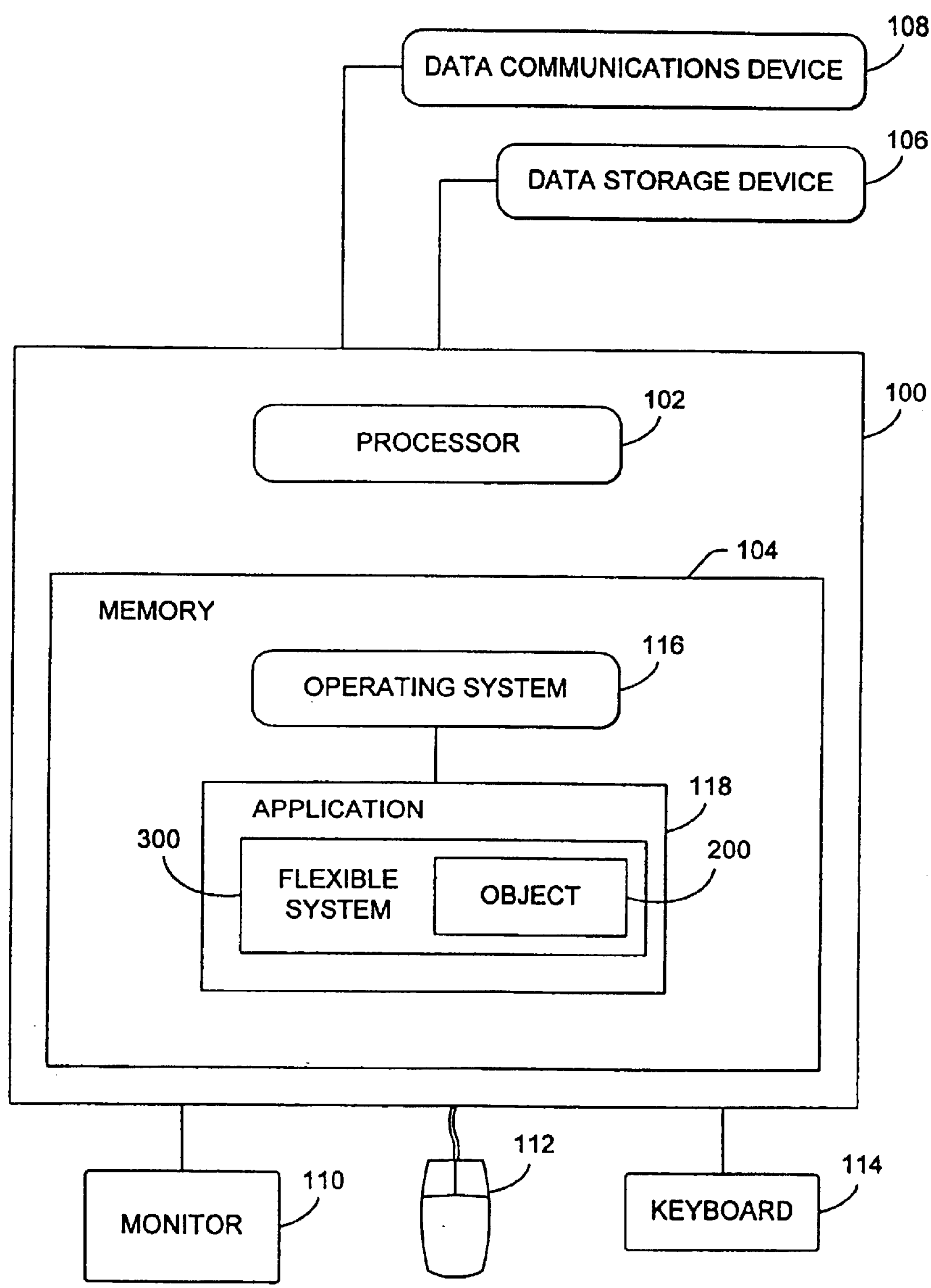
FIG. 1 is an exemplary hardware environment used to implement the preferred embodiment of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a software system that enables the creation and maintenance of relationships between properties of objects, wherein the objects can be authored by a user. The object comprises several properties for use in connecting, manipulating, displaying, mapping, and otherwise modifying an object.

Further, an object author can take any subordinate or superordinate object and create a "flex object" called the Flex Property Container (FPC) and bind the object to the FPC. Once the object is bound to the FPC, the FPC refers to the object as a client object.

The FPC acts as an interface to the client object and intercepts access to the client object properties, e.g., a read access is intercepted in order to evaluate any relationships assigned to this property of the client object, or a write access is intercepted in order to notify any properties which are related to this property. Access intercepts can be adjusted by the client object to honor write protection for selective properties of the client object.

The FPC is supported by a "Flex system" which creates and maintains relationships as required for each FPC. The relationships created and maintained by the Flex system are realized by associating one single or multiple line software program with one property of a client object. On a read access, the program is evaluated by the flex system, possibly resulting in a new value for the property. These programs are referred to as "expressions" or "formulas." By default, any property of the client object can be associated with a formula. The Flex object provides services for associating a formula with a property, operating the property during the program session, and maintaining it persistently.

The Flex system is optimized to evaluate formulas only on demand and only when required. To determine the requirement for formula evaluation, the Flex system automatically maintains a system of notifications. Notifications between disparate objects and properties are setup, operated, and removed by the Flex system as property formulas are created, stored, loaded, accessed, and destroyed during the lifetime of the program session.

Further, the Flex system can be applied to shape objects as well as any other object that has the ability to provide type information. Type information is the ability of an object to provide to another object the composition of the first object, e.g., a line object has two endpoints (each of which are point objects), with x-y coordinates. The line object can provide to an external request through a Microsoft ITypeInfo interface the composition of the endpoints of the line.

The Flex system also creates and maintains a table of global symbols useable by any formula. This table is referred to as the global symbol table. The Flex system provides services enabling software external to the Flex system to expand the global symbol table.

The Flex system also provides services for traversing the namespace of any object model in which some or all of the objects provide type information and access to properties. The Flex system uses this capability to identify and access objects and properties within object models and hierarchies of which the Flex system has no intrinsic knowledge.

Hardware Environment

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The personal computer 100 usually operates under the control of an operating system 116. The present invention is usually implemented in one or more application programs 118 that operate under the control of the operating system 116. The application program 118 is usually a CAD program or other graphics program. In the preferred embodiment, the application program 118 provides one or more objects 200 and a flexible system 300.

Generally, the application program 118 and objects 200 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

The present invention is applicable to any software object that can be created by an author. However, for ease of understanding of the present invention, an example using shape objects will be provided herein to illustrate the present invention. The shape object example provided below is not intended to limit the scope of the present invention.

Intelligent Shape Objects

Figure 2:
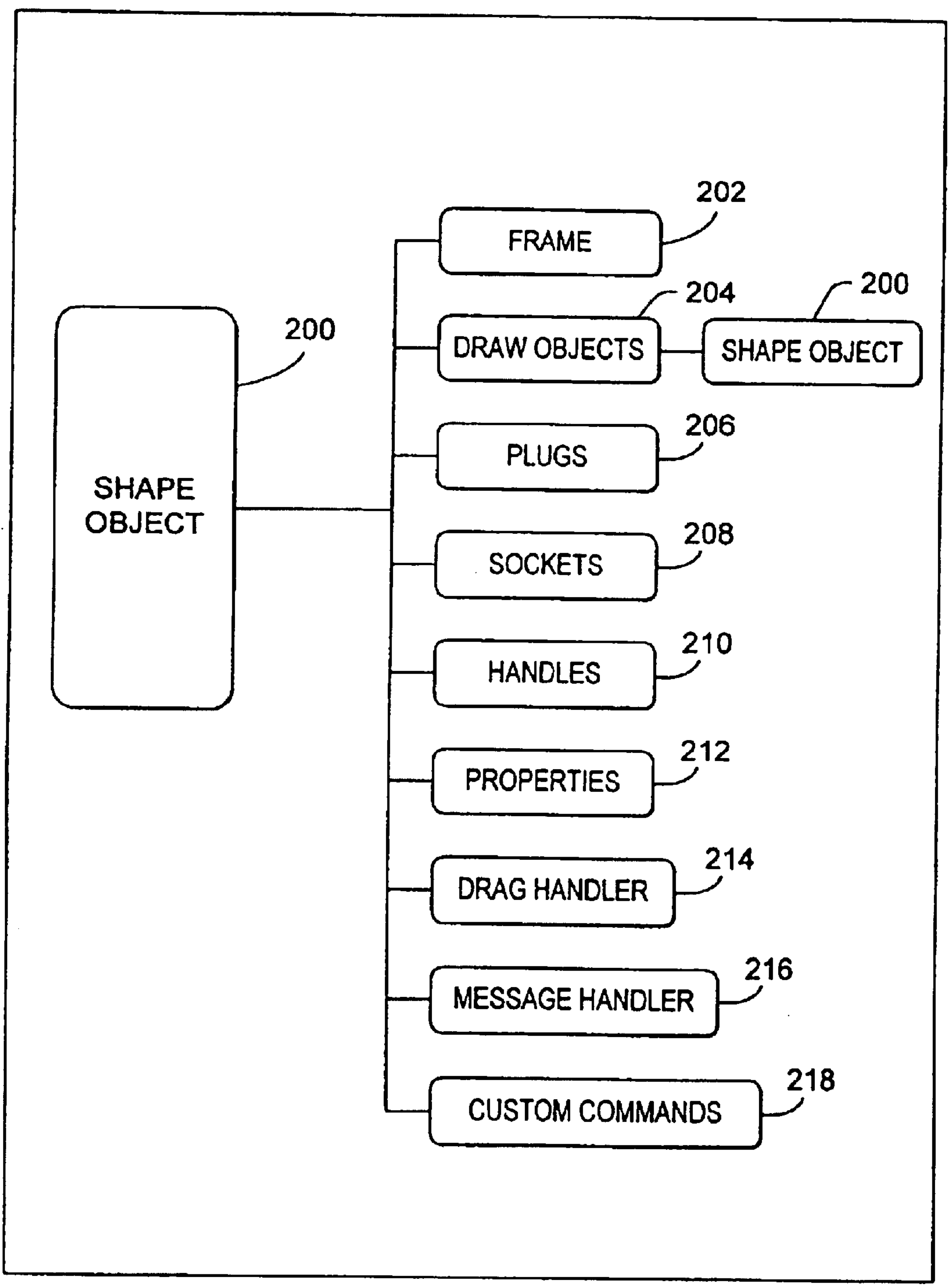
FIG. 2 illustrates the components of a shape object of the present invention.

FIG. 2 is a block diagram that illustrates the components of an object 200 according to the present invention. The object 200, which, for purposes of the example, is also known as an intelligent shape object 200, is comprised of a number of different elements: (1) a spatial frame 202 that provides the underlying structure and spatial mapping for the intelligent shape object 200; (2) a draw objects collection 204 that includes zero or more objects of geometry along with zero or more other (subordinate) shape objects 200 that together make up the (superordinate) shape object 200; (3) zero or more plugs 206 and sockets 208 that provide connectivity to other shape objects 200; (4) zero or more handles 210 that provide direct manipulation of the shape object 200, thereby allowing the user to stretch or otherwise resize the shape object 200; (5) a properties collection 212 that contains additional authorable properties of the shape object 200, e.g., extended properties defined by authors of the shape object 200; (6) a drag handler 214 that defines the behavior of the shape object 200 while the shape object 200 is being dragged; (7) a message handler 216 that defines the behavior of the shape object 200 when the shape object 200 receives system level commands or inputs; and (8) a custom command collection 218 that allows the user to define extended commands for the shape object 200. The frame 202, the draw objects 204, the plugs 206, the sockets 208, the handles 210, the properties 212, the drag handler 214, the message handler 216, and the custom commands 218 may be imbued with data and logic that add intelligence to the shape object 200, in order to provide added convenience to the user.

The shape object 200 is authored (also called created) by specifying the values of the properties of the objects comprising the shape object 200. A property value can be an object, which gives shape objects 200 nesting capabilities.

This aspect of adding new objects or replacing existing objects within a shape object 200 is part of the authoring process. Authoring is an activity that is external to the shape object 200; the shape object 200 source code, along with the source code for the objects within the shape object 200, are not affected by the authoring process. This bifurcation of the authoring activity from the shape object 200 allows the shape object to be authored statically or at runtime. The shape object 200 is then persistent until modified.

Shape objects 200 can be uniquely named, and can also generate events that reflect changes from the objects contained within shape object 200. External software can subscribe to these events, ensuring that the external software is notified of any changes to the shape object 200.

Example Shape Object

As an example, consider a shape object 200 that describes a chair. Such a shape object 200 has a geometry, which describes the paths used to render the appearance of the chair on a page. The shape object 200 may be composed of geometry that describes the chair's support members, with sub-shapes making up the seat, back, arms and other elements (and each of those shapes have their own properties, geometry, and so on). This geometry is defined as the frame 202 of the shape object 200.

The chair may be modular, taking optional wheels, arms, and levers, each of which connects to the shape object 200. These connection points are defined via plugs 206 and sockets 208. The chair may come in two or three sizes, any of which may be invoked by dragging handles. This chair may have a variety of properties such as materials, costs, names, and catalog numbers. And the chair resides within the document page with respect not only to the page itself but also with respect to the other furniture and shapes that may also be included on the page. The intelligence built into the chair's shape object 200, plugs 206, sockets 208, handles 210, and properties 212 provides the convenience of, for instance, adjusting cost with resizing, allowing or disallowing accessories (control levers, upholstery), enforcing consistent choices of seat, back, and arm designs, and whatever other relationships may be interdependent.

Frame

The frame 202 maps the spatial aspects of the elements of the shape object 200 to a particular space, notably the document page coordinate space. The frame 202 is a property of the shape object 200, and as such is under the control of the author of the shape object 200, e.g., the Visual Basic for Applications (VBA) programmer, and anyone else with access to the shape properties.

The frame 202 of a shape object 200 exposes a geometric framework to which the elements of the shape object 200 can be attached via expressions. The frame 202 also serves as a superstructure that relates all the other objects, some of which may be non-geometric, within the shape object 200. In addition, the frame 202 characterizes the spatial aspect of the shape object 200 as a whole, to allow the interpretation of methods such as Move, Rotate and Mirror. Finally, the frame 202 provides the mapping, if any, between the inside of the shape object 200 and the outside of the shape object 200.

The frame 202 is a description of a coordinate space that maps the local (inside the shape object 200) space to a parent (outside the shape object 200) space. For example, a straight line internal to a polar frame becomes an arc outside the frame. The frame 202 can encompass one, two, or three-dimensional spaces.

Several types of frames 202 can be envisioned: line frames, rectangular frames, scaling rectangle frames, and polar frames.

A line frame 202 provides a frame 202 for a line shape object 200 that has a start point and an end point. The user can modify the start or end point and manipulate the start and end points of the line.

A rectangular frame 202 provides a frame for a shape object 200 that remains of constant scale, e.g., a chair that only comes in one size.

A scaling rectangle frame 202 provides a frame for a shape object 200 that expands and shrinks in size, e.g., a custom-built desktop should expand or shrink to fit a space exactly. However, a scaling rectangle frame 202 also encompasses frames that expand or shrink in increments, such as a cubicle wall, depending on what sizes are manufactured.

A polar frame 202 provides a frame for a shape object 200 that always expands or shrinks in both dimensions proportionally. Other types of frames are also possible with the present invention.

Draw Objects Collection

The draw objects collection 204 stores a set of zero or more entities. A shape object 200 uses a draw objects collection 204 to define the geometry for rendering the shape object's 200 appearance. At least one entity 204 holds the geometry that makes up the shape object 200. The draw objects collection 204 is a standalone collection of objects to hold geometry for shapes and other objects. In addition, the entity 204 can hold other shape objects 200 to fully define the shape object 200. A complex shape object 200 may comprise several entities in the draw objects collection 204, each of which may store some geometry as well as particular related sub-shape objects 200.

Plugs and Sockets

The plugs 206 and sockets 208 enable geometric and logical connections between shape objects 200. Plugs 206 enable one side of the connection, and sockets 208 enable the other side. Plugs 206 and sockets 208 can be designed to accept any type of mating connectors, or specific types of connectors, much like electrical plugs and sockets 208 used in a home to distinguish between 110 VAC and 320 VAC connections. For example, a deluxe chair shape object 200 may contain sockets 208 that accept only deluxe plugs 206 to disallow mating less expensive seats, backs, and arms to the deluxe chair shape object 200.

Handles

The handles 210 are points located within the shape object 200 that are exposed to the user interface (UI) when the shape object 200 is selected. Handles 210 allow direct manipulation of geometry within the shape object 200, as well as any other shape object 200 parameter of collection element that can be referenced via expressions. Handles 210 have properties, such as x-y position, geometry, and define a relationship between mouse and handle position. With the handles 210 of the present invention, the shape author can constrain handles to particular range of motion as function of mouse movement. Typically, the handle 210 x and y coordinates are directly related to the mouse x and y coordinates. However, the handle 210 of the present invention allows the shape author to relate the handle x and y coordinates to any function, or a constant. For example, the shape author can equate the x coordinate of the handle 210 (handlex) to a constant, and the y coordinate of handle 210 (handley) to the y coordinate of mouse pointing device 112. This would create a handle 210 that moves only in the y direction regardless of the x position of the mouse pointing device 112. The shape author can use any expression, e.g., trigonometric functions, equations, or other functions to constrain handle properties. The handle 212 position is thus independent of mouse position, and the shape author relates the handle 212 position to the mouse pointing device 112 position by using an expression to achieve any desired handle 212 motion.

Properties

The properties 212 are other custom or extended properties defined by the shape object 200 author not contained within the frame 202, handles 210, plugs 206, and sockets 208. For example, custom properties 212 can be a manufacturer code (a string), a price (a currency value) or a coefficient of friction for a given material. Properties 212 can also be defined for intermediate or scratch values within a shape object 200.

The Drag Handler

The shape object 200 contains objects that handle messages and the behavior of the shape object 200. The shape object 200 contains an object that, for example, handles the shape object's 200 drag and drop behavior. This object is known as the drag handler 214. The drag handler 214 can be customized or initially authored by a user, which enables a user to change the actions performed by the shape object 200 upon entering the program as well as the shape object's 200 interactions with other shape objects 200.

The Message Handler

The shape object 200 also contains an object that handles messages passed down from the containing system. This object is called the message handler 216. The message handler 216, like the drag handler 214, can be customized or initially authored by a user, which enables a user to change the actions performed by the shape object 200 in response to keyboard, mouse, and other system events.

Custom Commands

In addition to the above, each shape object 200 has custom commands 218 that can be programmed by the author. These custom commands 218 are accessed by the user by using a context menu, typically accessed by using the right hand button on a mouse pointing device 112. For example, the chair shape object 200 described above may have a custom command 218 associated with it to include a solid back on the shape object 200, or a carved back, or a padded seat, etc., depending on the desires of the author.

Creating a Shape

The first step in creating a shape object 200 is to create the frame of the shape object 200. This frame comprises computer software code that performs several functions, e.g., mapping the spatial aspects of the shape object 200 to the document coordinate space (or any other space desired by the author), providing a framework to attach the other elements or objects associated with that shape object 200, relating the subordinate objects within the shape object 200 together, and characterizing the spatial aspects of the shape object 200 such that commands that are applied to the shape can be correctly interpreted.

Although there are several methods to create a frame 202, or a shape object 200, initially, an author selects a frame as a basis for the remainder of the shape object.

As an example, to create a shape object 200 with a rectangular frame 202 of height 20 and width 25 with the lower left corner of the rectangular frame 202 at x=10, y=30, software code is written within the module window 308 as follows:

```
Sub Main ( )
Dim RFrm As ScaledRectFrame
Set RFrm=Shp.Factory.CreateScaledRectFrame (10,30,
    25,20)
Shp.Frame=RFrm
End Sub
```

Once the frame is created, a property (or multiple properties) of the shape object 200 is created by the shape author. These properties include the draw objects collection 204, the plugs 206 and sockets 208, the handles 210, the custom properties 212, the drag handler 214, the message handler 216, and the custom commands 218. The author adds definition to these properties, either in the form of mathematical expressions or constants, to create the property itself.

This is performed by creating the geometry of the shape, for example, a circle of radius 10, centered at x=40 and y=50, by writing software code to create a circle as an entity 204 as follows:

```
Dim Cir As Circle2D
Set Cir=Ent. AddCircle(40, 50, 10)
```

Additional properties or subordinate objects can be added to the shape object 200 as needed or desired by the author.

The author then couples the property to the frame 202 to allow the frame to use the defined property, by adding lines of code to window 308 to add the circle to the draw objects collection 204 as follows:

```
Dim Ent As DrawObjects
Set Ent=Doc.DrawObjects
```

The property can then be modified to display the desired information, e.g., by returning to window 308 and changing the properties, such as the radius of the circle, etc.

The use of software code to create a shape object 200 is preferred to using a pointing device 112 because software code provides more precision to the shape. Further, software allows an author to add more exotic properties to a shape, which would be difficult if not impossible to create using a pointing device 112.

Using the Flex System with a Shape

Now that a shape has been created, some users may want to define the radius of the circle as a variable, so that instead of the radius being 10 units, it is defined to be 10 times a given value, e.g.,

```
Dim Cir As Circle2D
Set Cir=Ent. AddCircle(40, 50, 10q)
```

So the radius of the circle is now defined as ten times the value of the variable q. The variable q can be determined globally, and thus defined for a software session to be a constant value e.g., q=5, or determined by reference to a formula or to other variables. The Flex system uses subroutines to perform these definitions and to access and retrieve values from the object definition.

Expressions in the Flex system are formulas that combine variables and constants to produce new values for the properties of a shape object 200. By using a Flex Property Container, users assign expressions to relate a property to one or more values, or create parametric relationships between properties and shape objects 200. These relationships create dynamic shape objects 200 with custom behaviors. Expressions in the Flex system contain variables, constants, and mathematical functions, such as sine and cosine, to determine the value of a shape object 200 property. This capability of the Flex system allows users to base the value of a shape object 200 property on various items, allowing for greater control and capability of the CAD system itself.

Subroutines in Flex

To perform this extended capability, users write expressions for shape objects 200 in VBA. This applies the Flex system to a given shape object 200. To allow for variables, a user initially assigns an expression to a property. This is done using the "SetExpression" command in VBA.

Once the expression has been assigned, the user, may want to review the expression associated with a property value. This is performed using the "GetExpression" command in VBA. If the user decides that the expression is correct, the user then specifies to the shape object 200 that the expression is to be evaluated and used to calculate the shape object 200 value. This is performed using the "RemoveExpression" command in VBA.

Other functions that further define the Flex system are envisioned. The above list is for illustrative purposes only.

Programming in the Flex System and Using FPCs

Using the subroutines described above, a shape author can now control, both globally and locally, or for a single computer session, properties of shape objects 200. This control allows the shape author to modify individual variables and view their effect on the finished document on the monitor 110 of the computer without reprogramming all of the interrelationships within a shape object 200. Further, the shape author can selectively use the changes within the document by not using the resultant changes on some of the shapes, while other shapes will retain the changes made using the variables. Flex allows the author to use or not use the variable changes, as the author decides.

Figure 3:
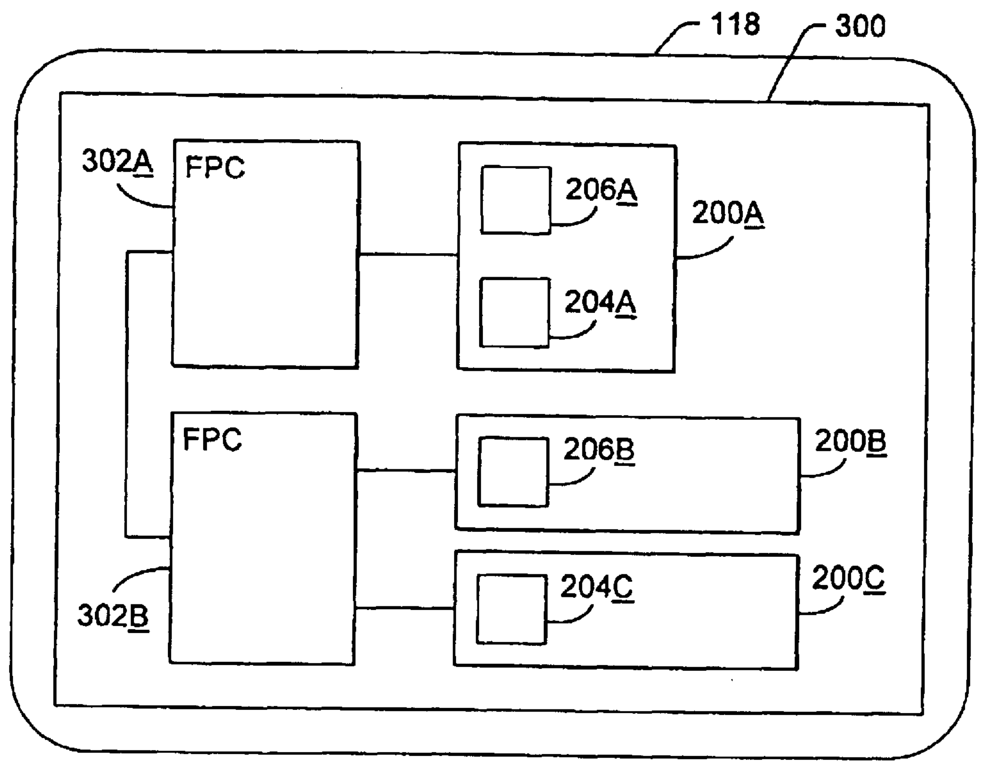
FIG. 3 illustrates the interconnections of the framework of the present invention.

FIG. 3 illustrates the functions of the flex system and flexible property containers of the present invention.

Within the application 118, the flex system 300 allows a user to create and maintain relationships between shape objects 200 as well as between flexible property containers 302A and 302B. These relationships are created, maintained, and destroyed by the user programming into the flex system 300 the relationships that are desired.

As an example, FPC 302A positions a plug 206A at a midpoint of a line in an entity collection 204A that connects the start points of two arcs as follows:

```
Set Plug=shape.Plugs.Add
Set fpc=Plug.Expressions
fpc.SetExpression "X", "0.5*(Myshape.DrawObjects(0)
    .Set(0).Startpoint.X+Myshape.DrawObjects(0).Set(2)
    .StartpointX)"
```

The first line of the expression adds a plug 206A to a shape object 200A, declares a variable and names the variable fpc (flexible property container) as the name of the expression, and uses the SetExpression command to identify the object expression property for the x-coordinate of the plug 206A as halfway (0.5) between the startpoints (Set(0).Startpoint.x and Set(2).Startpoint.x) of two entities 204A (myshape.drawobject(0), called twice in the definition).

Similarly, an FPC 302 can be used to define an expression for a first shape object 200B based on a property of another shape object 200C. As an example, FPC 302B positions a plug 206B at a midpoint of a line in an entity collection 204C that connects one shape object's 200B arc to another shape object's 200C arc as follows:

```
Set Plug=shape.Plugs.Add
Set fpc=Plug.Expressions
fpc.SetExpression "X", "0.5*(Myshape.DrawObjects(0)
    .Set(0).Startpoint.X+Myshape.DrawObjects(1).Set(2)
    .StartpointX)"
```

The first line of the expression adds a plug 206B to a shape object 200B, declares a variable and names the variable fpc (flexible property container) as the name of the expression, and uses the SetExpression command to identify the object expression property for the x-coordinate of the plug as halfway (0.5) between the startpoints (Set(0).Startpoint.x and Set(2).Startpoint.x) of two shape objects 200, namely shape object 200B, (myshape.drawobject(0)) and shape object 200C (myshape.drawobject(1)).

As a user moves the startpoints of the shape objects 200B and 200C, the plug will automatically reposition itself to remain on the midpoint of the line connecting the two objects.

Flowchart

Figure 4:
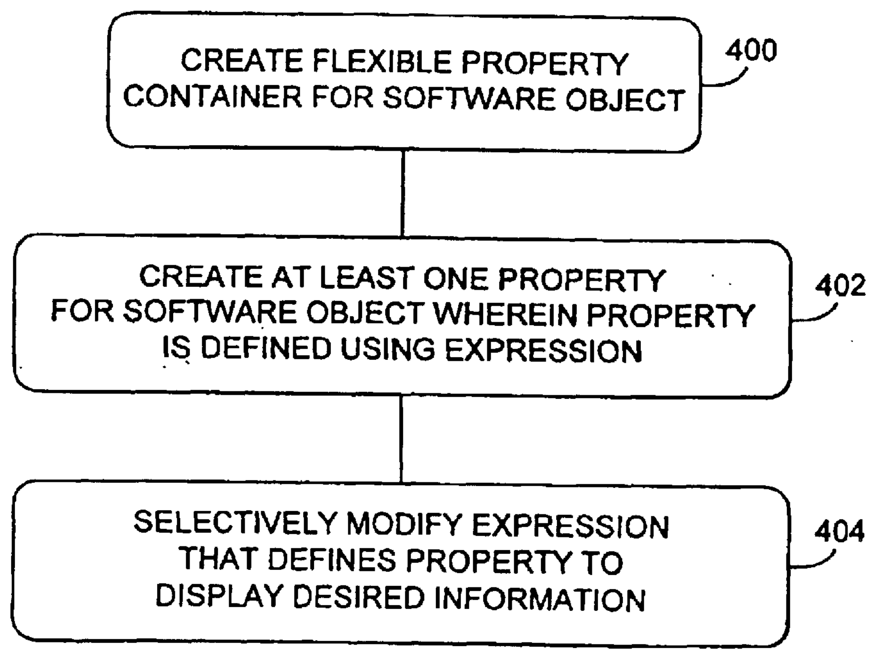
FIG. 4 is a flowchart that illustrates the general logic of performing the steps of the present invention.

FIG. 4 is a flowchart that illustrates the general logic of performing the steps of the present invention.

Block 400 represents performing the step of creating a flexible property container for the software object.

Block 402 represents performing the step of creating at least one property of the software object, wherein the property is defined using an expression, the property of the software object being contained within the flexible property container.

Block 404 represents performing the step of selectively modifying the expression that defines the property to display desired information on the monitor.

Conclusion

This concludes the description of the preferred embodiment of the invention. The following describes some alternative embodiments for accomplishing the present invention.

For example, any type of computer, such as a mainframe, minicomputer, workstation or personal computer, could be used with the present invention. In addition, any software program, application or operating system having a user interface could benefit from the present invention.

The above teaching also supports additional functions that may also be implemented using the intelligent shape objects of the present invention. In addition, the intelligent shapes can be integrated closely with each application program by any number of different methods.

In summary, the present invention discloses a method, apparatus, and article of manufacture for enabling the creation of authorable objects. The framework serves as an expression evaluator, notification manager, and can traverse individual object models to use properties of one model to define another. An object model (data model) is a map of an object's properties and methods. The framework of the present invention binds to the properties and methods and intercepts access to the properties for storage and evaluation of variables within the definitions of the properties.

Binding the frame to the object accesses and uses the type info for the object to determine the properties of the object. In addition, the framework provides a method for the object author to override and specialize the properties to describe extensions of the type information.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of maintaining one or more properties of one or more software objects comprising:

(a) binding a container object for each software object, wherein:

(i) the container object acts as an interface to one or more properties of the bound software object;

(ii) the container object controls and intercepts access to the one or more properties of the bound software object; and (iii) the bound software object is a shape object in a computer drawing program, wherein the one or more properties of the shape object define a geometry;

(b) associating a software program of the container object with one of the properties of the bound software object, wherein the software program comprises an expression or formula that utilizes one or more variables to produce a value for the associated property; and (c) upon interception access evaluating the software program to produce the value for the associated property.

2. The method of claim 1, wherein the software program is only evaluated when required by a computer program.

3. The method of claim 1, further comprising modifying the software program; and evaluating the modified software program to produce a new value for the associated property.

4. The method of claim 1, further comprising automatically maintaining a system of notifications to determine when to evaluate the software program to produce the value.

5. The method of claim 1, further comprising maintaining a table of global symbols that is utilized by the software program to produce the value.

6. The method of claim 1, further comprising persistently maintaining the one or more properties.

7. A system for maintaining one or more properties of one or more software objects, the system comprising:

(a) one or more software objects in a computer drawing program, wherein the one or more software objects comprise shape objects having one or more properties, wherein the one or more properties define a geometry;

(b) a container object bound to each software object, the container object comprising a software program associated with as least one of the properties of the bound software object, wherein the container object is configured to:

(i) act as an interface to the one or more properties of the bound software object;

(ii) control and intercept access to the one or more properties of the bound software object; and (iii) evaluate the software program upon intercepting access, to produce a value for the associated property, wherein the software program comprises an expression or formula that utilizes one or more variables to produce the value.

8. The system of claim 7, wherein the software program is only evaluated when required by a computer program.

9. The system of claim 7, wherein the container object is further configured to:

modify the software program; and evaluate the modified software program to produce a new value for the associated property.

10. The system of claim 7, wherein the container object is further configured to automatically maintain a system notifications to determine when to evaluate the software program to produce the value.

11. The system of claim 7, further comprising a table of global symbols that is utilized by the software program to produce the value.

12. The system of claim 7, wherein the container object is further configured to persistently maintain the one or more properties.

13. An article of manufacture comprising a program storage medium reachable by a computer and embodying one or more instructions executable by the computer to perform a method for maintaining one or more properties of one or more software objects in a computer system, the method comprising:

(a) binding a container object for each software object, wherein:

(i) the container object acts as an interface to one or more properties of the bound software object;

(ii) the container object control access to the one or more properties of the bound software object, and (iii) the bound software object is a shape object in a computer drawing program, wherein the one or more properties of the shape object define a geometry;

(b) associating a software program of the container object with one of the properties of the bound software object; and (c) upon intercepting access, evaluating the software program to produce a value for the associated property, wherein the software program comprises an expression or formula that utilizes one or more variables to produce the value.

14. The article of manufacture of claim 13, wherein the method further comprises:

modifying the software program; and evaluating the modified software program to produce a new value for the associated property.

15. The article of manufacture of claim 13, wherein the method further comprises automatically maintaining a system of notifications to determine when to evaluate the software program to produce the value.

16. The article of manufacture of claim 13, wherein the method further comprises maintaining a table of global symbols that is utilized by the software program to produce the value.

17. The article of manufacture of claim 13, wherein the method further comprises persistently maintaining the one or more properties.

18. The method of claim 1, wherein the container object intercepts access to the one or more properties of the bound software object.

19. The method of claim 18, wherein a read access is intercepted to evaluate any relationships assigned to the one or more properties.

20. The method of claim 18, wherein a write access is intercepted to notify any of the one or more properties which are related to the property that is being accessed.

21. The system of claim 7, wherein the container object intercepts access to the one or more properties of the bound software object.

22. The system of claim 21, wherein a read access is intercepted to evaluate any relationship assigned to the one or more properties.

23. The system of claim 21, wherein a write access is intercepted to notify any of the one or more properties which are related to the property that is being accessed.

24. The article of manufacture of claim 13, wherein the container object intercepts access to the one or more properties of the bound software object.

25. The article of manufacture of claim 24, wherein a read access is intercepted to evaluate any relationships assigned to the one or more properties.

26. The article of manufacture of claim 24, wherein a write access is intercepted co notify any of the one or more properties which are related to the property that is being accessed.

* * * * *

UNITED STATES PATENT AND TRADEMARK OFFICE

CERTIFICATE OF CORRECTION

PATENT NO. : 6,999,102 B2
APPLICATION NO. : 10/223179
DATED : February 14, 2006
INVENTOR(S) : Lawrence D. Felser et al.

It is certified that error appears in the above-identified patent and that said Letters Patent is hereby corrected as shown below:

Column 11, line 51, for claim 10, after “system” insert --of--.
Column 12, line 49, for claim 22, “relationship” should read --relationships--.
Column 12, line 61, for claim 26, “co” should read --to--.

Signed and Sealed this

Sixth Day of February, 2007

JON W. DUDAS
*Director of the United States Patent and Trademark Office*